United States Patent [19]

Bachmann

[11] 4,143,511

[45] Mar. 13, 1979

[54] SHOCK-ABSORBING BEARING FOR TIMEPIECE MOVEMENTS

[75] Inventor: Peter Bachmann, Bettlach, Switzerland

[73] Assignee: Ebauches Bettlach S.A., Solothurn, Switzerland

[21] Appl. No.: 850,675

[22] Filed: Nov. 11, 1977

[30] Foreign Application Priority Data

Nov. 22, 1976 [CH] Switzerland ........................ 14660/76

[51] Int. Cl.[2] ........................ G04B 31/02; F16C 27/06

[52] U.S. Cl. ........................................ 58/140 A; 308/26

[58] Field of Search ........................ 58/140 R, 140 A; 308/26

[56] References Cited

U.S. PATENT DOCUMENTS

| | | | |
|---|---|---|---|
| 2,525,525 | 10/1958 | Colomb | 58/140 A |
| 2,891,379 | 6/1959 | Seitz | 58/140 A |

FOREIGN PATENT DOCUMENTS

| | | | |
|---|---|---|---|
| 2164937 | 6/1975 | France. | |
| 272621 | 3/1951 | Switzerland | 58/140 A |
| 567755 | 12/1973 | Switzerland | 58/140 R |

*Primary Examiner*—Edith S. Jackmon
*Attorney, Agent, or Firm*—Stevens, Davis, Miller & Mosher

[57] ABSTRACT

This invention relates to shock-absorbing bearings for time-piece movements, and more particularly to a bearing of the type wherein a one-piece plastic shock-absorbing element including a bearing-block portion, a bearing-cap portion, and a resilient zone connecting those portions is fitted in an opening in a metal support member.

8 Claims, 4 Drawing Figures

SHOCK-ABSORBING BEARING FOR TIMEPIECE MOVEMENTS

DESCRIPTION OF THE PRIOR ART

Until now, most of the shock-absorbing bearings for watch movements, such as that disclosed in U.K. Pat. No. 578,224, have been composed of several different parts, the production and assembly of which require numerous operations.

In an effort to reduce manufacturing costs, it has already been sought to produce shock-absorbing bearings for timepiece movements, especially for watch movements, comprising one or more molded plastic parts or composed entirely of such parts. Until now, however, these plastic bearings have not answered the practical requirements to the full extent desirable.

A bearing taught by German Pat. No. 1,927,358 comprises a plastic shock-absorbing element fitted in an opening in a frame element acting as a support. The bearing cap is integral with a rod-shaped central element, one end of which is fitted in an opening of limited diameter in the base of the shock-absorbing element. However, this design is not sufficiently reliable because if the relative movements of the bearing cap with respect to the base of the shock-absorbing element are completely free, the centering and guidance of the bearing cap are faulty, whereas if those movments are impeded, the bearing is liable to act like a rigid bearing, and its shock-absorbing properties are inadequate.

In another design disclosed in French Utility Certificate No. 2,006,825, the plastic shock-absorbing element comprises a bearing cap connected to a bearing block by arms. In this design, however, the centering of the bearing cap is not ensured. Moreover, the bearing requires an axial stop, and the metal support is a part requiring machining operations which tend to increase the cost of the bearing.

According to another prior art proposal described in French Pat. No. 2,164,937, the shock-absorbing element is constituted solely by a bearing cap and resilient arms. Consequently, the metal support acts as the bearing block, so that in this case, too, the machining operations necessary for this part increase the price.

SUMMARY OF THE INVENTION

It is an object of this invention to provide an improved shock-absorbing bearing of the type initially mentioned which can be produced by high-speed, automated manufacturing methods while still ensuring high precision, which is easy to assemble, and which meets the standard specifications for shock-resistance and pivoting accuracy in wrist-watch movements.

To this end, in the shock-absorbing bearing according to the present invention, the improvement comprises seating means forming part of the bearing-block portion of the shock-absorbing element, centering means forming part of the bearing-cap portion of the shock-absorbing element, and biasing means forming part of the resilient zone and cooperating with the support member for pressing the centering means axially against the seating means.

A preferred embodiment of the invention will now be described in detail with reference to the accompanying drawings, in which:

DESCRIPTION OF THE PREFERRED EMBODIMENT

Figure 1:
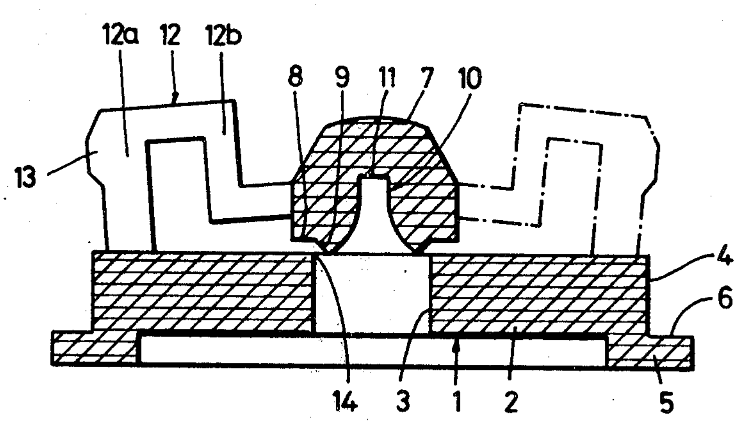
FIG. 1 is an axial section through the main part of the bearing prior to assembly.

As may be seen in FIG. 1, the shock-absorbing element consists of a single part 1 which will preferably be made of a plastic material capable of being formed by pressure molding or injection. Moreover, this material should have suitable resilience and self-lubricating properties. Part 1 is made up of three main portions: a bearing-block portion 2, a bearing-cap portion 7, and a resilient connecting portion formed by three arms 12. Bearing block 2, in the form of a flat disk, has a circular central opening 3 and a cylindrical lateral outer face 4. It is molded with a peripheral rim 5 which extends out laterally at one end of face 4 and forms a shoulder 6. Bearing cap 7 is generally cylindrical in shape, with a convex face at one end and a flat shoulder 8 bounding a frustoconical centering surface 9 at the other end. Also at this latter end is a cylindroconical recess 10 having a flat bottom 11 intended to receive the pivot of a moving part of a timepiece movement, as may be seen in FIG. 2. Bearing cap 7 is joined to bearing block 2 by the three resilient arms 12, each of which includes an outer portion 12*a* and a central portion 12*b*. Portion 12*a* extends out axially but slightly at a slant from the periphery of the flat face of bearing block 2 remote from rim 5. Outer porton 12*a* of each of arms 12 has a rectangular cross-section and includes a projection 13 which, when part 1 stands free prior to fitting, as shown in FIG. 1, extends slightly beyond the circle defined by face 4. Starting from the upper ends of portions 12*a*, arms 12 continue into their central portions 12*b*, likewise having a cross-section which is rectangular but slightly smaller than that of portion 12*a*. Viewed in elevation, central portions 12*b* are substantially Z-shaped and extend up to the lateral outer face of bearing cap 7, which they join at a tangent (cf. FIG. 3).

FIG. 1 shows part 1 as it appears after its manufacture by molding. It will be noted that bearing cap 7, borne by arms 12, is held in a slightly raised position with respect to the upper edge 14 of center hole 3, edge 14 having the same diameter as the inner edge of shoulder 8.

Figure 2:
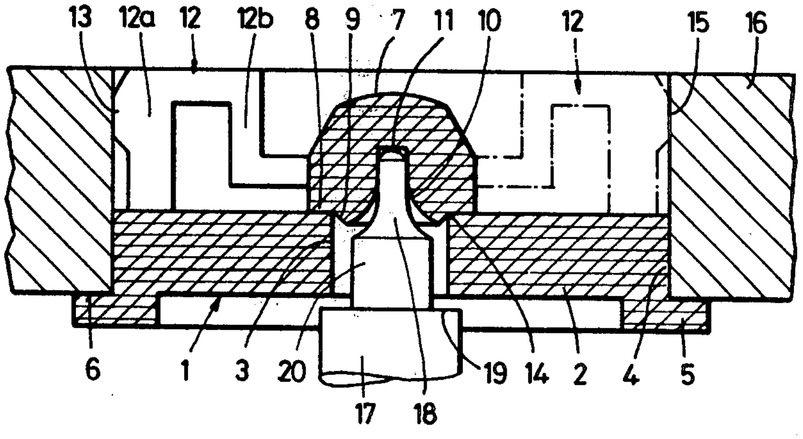
FIG. 2 is an axial section analogous to FIG. 1, showing the main bearing part fitted in a circular opening in a frame element.
Figure 3:
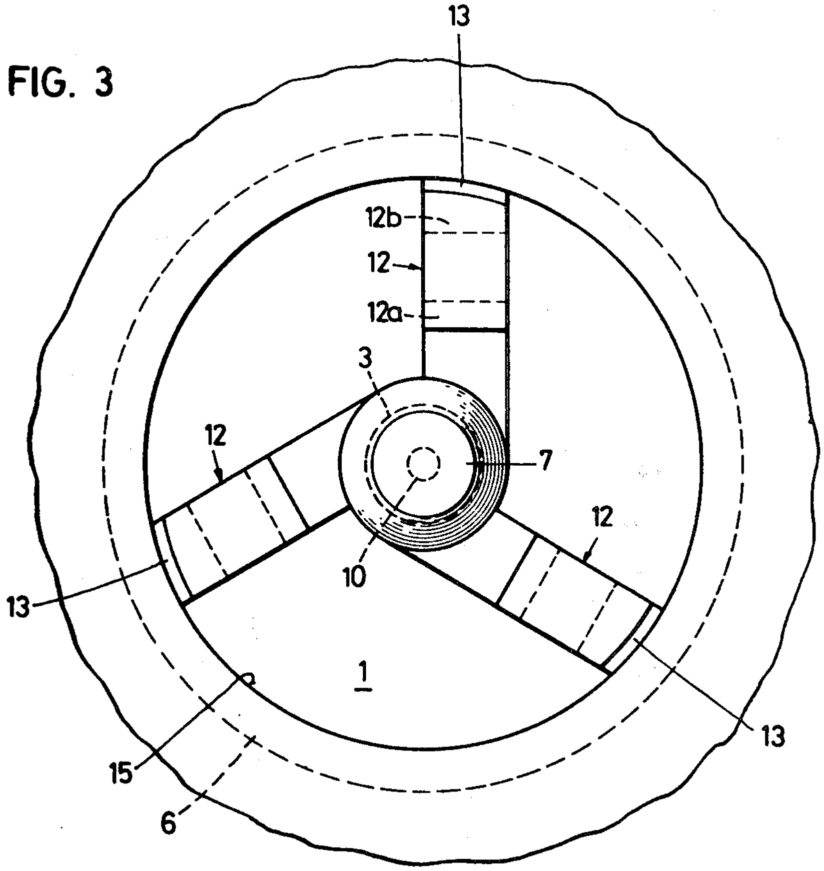
FIG. 3 is a top plan view of the bearing of FIG. 2.

FIG. 2 shows bearing part 1 fitted into a circular opening 15 in its support, here constituted by a frame element 16, which may be a cock or plate of a wrist-watch movement. Hole 15 may be blanked, and its diameter will be matched to that of face 4 of bearing block 2 so as to ensure a snug fit. Thus bearing block 2 may be driven into place, and it will be positioned at the proper level when shoulder 6 rests against the inner face of frame element 16. It will be noted that bearing block 2 is much thinner than frame element 16, so that bearing cap 7 and arms 12 are still within the bounds of opening 15. When part 1 is fitted into opening 15, projections 13 cause a slight deformation of arms 12, so that bearing cap 7 comes to rest upon the upper surface of bearing block 2. Frustoconical surface 9 ensures proper centering of bearing cap 7, while the bias thus imparted to arms 12 determines the extent of the force of resistance borne by bearing cap 7 in the case of shocks.

Figure 4:
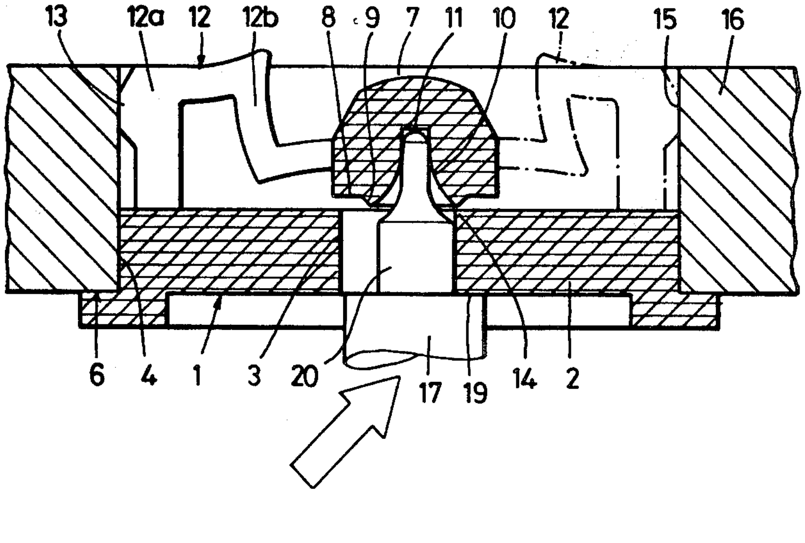
FIG. 4 is a sectional view analogous to FIG. 2, showing the movement of the bearing cap in the event of an oblique shock.

Visible in FIG. 2 is part of an arbor 17 of a moving part of a timepiece movement, the pivot 18 of which is fitted into recess 10. A shoulder 19 of arbor 17 cooperates with the lower face of bearing block 2 to limit the movement of arbor 17 in the event of an axial shock. A pivot-shank 20, slightly smaller in diameter than hole 3, acts as a stop in the event of a radial shock and FIG. 4 shows the position which may be assumed by bearing cap 7 in the event of an oblique shock. Arms 12 are then unequally deformed. The resilient force resulting from this deformation returns bearing cap 7 to the position shown in FIG. 2 after the shock, with centering cone 9 ensuring its exact positioning.

Although FIG. 2 shows the end of pivot 18 in contact with the bottom 11 of recess 10, it is to be understood that the dimension of shoulder 6 is such that the moving part whose arbor is designated by reference numeral 17 has a certain amount of axial clearance when fitted between two bearings such as bearing 1.

Thus, a bearing has been produced which has shock-absorbing and pivoting properties corresponding to very high criteria of quality for wrist-watch movements and which can be mass-produced in very large quantities by high-speed, automated means. Assembly of the bearing is also very simple since it suffices to fit part 1 into opening 15, making sure that projections 13 cause arms 12 to bend slightly and give them the necessary bias. The bearings are driven into place from the inner face of the frame element, so that they can in no event be displaced during use as a result of the shocks they undergo. The design described has small dimensions and lends itself most particularly to the production of bearings for mechanical watch balances. It will be realized that the concept of the arrangement depicted in FIG. 1 satisfies both the manufacturing requirements of injection molds and the requirements to be met by the resilient arms which must be biased when in use. The number of arms might be other than three. In certain cases, a single arm might suffice; however, it will be preferable to provide at least two arms. Furthermore, the arms might equally well be positioned radially with respect to the bearing cap instead of tangentially.

What is claimed is:

1. In a shock-absorbing bearing for a timepiece movement, of the type wherein a one-piece plastic shock-absorbing element including a bearing-block portion, a bearing-cap portion, and a resilient zone connecting said portions is fitted in an opening in a metal support member, the improvement comprising:

seating means forming part of said bearing-block portion, centering means forming part of said bearing-cap portion, and biasing means forming part of said resilient zone and cooperating with said support member for pressing said centering means axially against said seating means.

2. The bearing of claim 1, wherein said resilient zone includes three resilient arms connecting said bearing-block portion to said bearing-cap portion.

3. The bearing of claim 2, wherein each of said arms comprises an outer portion extending axially from the periphery of said bearing-block portion and including an outer projection constituting said biasing means, and an inner portion joining said outer portion to said bearing-cap portion.

4. The bearing of claim 3, wherein said outer projections extend laterally beyond a circle defined by said opening.

5. The bearing of claim 3, wherein said inner portions are substantially Z-shaped.

6. The bearing of claim 5, wherein said arms join said bearing-cap at a tangent.

7. The bearing of claim 1, wherein said bearing-block portion includes a cylindrical lateral surface adapted to be driven into said opening and a peripheral rim resting against a face of said support member.

8. The bearing of claim 1, wherein said bearing-block portion includes a continuous aperture having a cylindrical surface acting as a lateral stop in the event of radial shock, and said bearing-cap portion includes a plane surface facing said bearing-block portion, said centering means taking the form of a frustoconical projection extending from said plane surface, and said seating means taking the form of a circular edge bounded by the upper face of said bearing-block portion and said cylindrical surface of said aperture.

* * * * *